Patented Sept. 6, 1949

2,481,349

UNITED STATES PATENT OFFICE 2,481,349

POLYMERIZATION OF ORGANIC SILICON COMPOUNDS

Norman P. Robie, Lewiston, N. Y., assignor to The Carborundum Company, Niagara Falls, N. Y., a corporation of Delaware No Drawing. Application July 17, 1944, Serial No. 545,397

11 Claims. (Cl. 260—46.5)

This invention relates to new and useful compositions of matter and to methods of preparation of the same. More particularly, it relates to resinous compositions formed by the polymerization of organic silicon compounds with or without the copolymerization therewith of other monomeric materials of resin-forming habit.

It has heretofore been known to make certain organic esters of silicon which have been found to be polymerizable only with difficulty, and have been used as mold coatings in which application they have broken down to provide a thin film of silica. Other silicon ortho esters have been polymerized satisfactorily only by joint use with polymerizing substances.

It is an object of the present invention to provide organic silicon compounds which are capable of being readily polymerized alone to form resins and further will copolymerize readily with other monomeric materials to form highly viscous or solid resinous products. It is a further object to provide organic silicon compounds of facile resin-forming habit which by reason of their silicon content will have a high solvent and heat resistance and at the same time will retain sufficient of the organic portion of the resinous compositions to remain satisfactorily flexible and free from brittleness or friability. It is a further object to provide organic silicon compounds which are polymerizable through points of unsaturation by chain polymerization and will not depend entirely upon a condensation mechanism for their resin-forming habits. Still another object is the provision of practical methods of preparing organic silicon compounds of facile resin-forming habit. These and other objects and advantages ancillary thereto will become apparent as the description of the invention proceeds.

I have found that organic silicon resins of facile resin-forming habit and of good stability can be made by polymerizing, with or without the inclusion of a copolymerizing monomeric material, silicon compounds having the general formula $(R)_n Si(OR')_x (OH)_{4-n-x}$, wherein R is an alkyl or aryl grouping, R' is an organic aliphatic grouping, and preferably an unsaturated grouping, and $n$ and $x$ are positive numbers totalling 4 or less than 4. When $n$ plus $x$ equals 4, the (OH) constituent drops out and the material will respond to the formula $(R)_n Si(OR')_{4-n}$, in which case the R' is always an unsaturated organic aliphatic grouping. Among these aliphatic characteristic groupings which may be represented by R' are the characteristic aliphatic groupings of an unsaturated secondary alcohol having terminal $CH_2=$ unsaturation, such as methyl vinyl carbinol, an unsaturated hydroxy ester of a polyhydric alcohol and an olefinic acid, such as ethylene glycol monomethacrylate, an unsaturated primary alcohol or an unsaturated hydroxy ether. When the compound is one responding to the general formula $(R)_n Si(OR')_x (OH)_{4-n-x}$ wherein $n$ plus $x$ is less than 4 and the compound is therefore partially hydrolyzed, then R', in addition to the unsaturated aliphatic groupings set forth above, may represent the characteristic aliphatic grouping of a saturated aliphatic alcohol, in which case instead of the alcohol, an alkylene oxide, such as propylene oxide, can be used in the process to form an alcoholic grouping, if desired. Generally speaking, the resins of this invention can be referred to as polymerized alkyl substituted silicanes, with or without the copolymerization therewith of suitable monomeric materials. Briefly, they are prepared by reacting an alkyl- or aryl-silicon halide, as for example, methyl silicon trichloride, $(CH_3)SiCl_3$, with an unsaturated aliphatic alcohol, a saturated aliphatic alcohol or in place thereof an alkylene oxide, or an hydroxy ester or ether to form the corresponding alkyl or aryl substituted silicane. The resulting silicane may or may not be partially hydrolyzed depending upon the character and proportions of reacting materials used. The resulting silicanes are readily polymerized by dehydration-condensation and/or addition polymerization reaction to form resins of desirable and useful characteristics. The alcohol, or hydroxy ester or ether selected for the reaction is preferably one of the olefinic or unsaturated type, since by the use of compounds possessing points of unsaturation within the organic radical the resulting silicanes possess a number of double bonds or points of unsaturation which provide additional potential means for copolymerization of the silicanes with other monomeric materials, in addition to providing a further means of polymerization of the silicanes alone over and above the polymerization taking place through dehydration-condensation action.

In accordance with the present invention the above silicon polymerization products can be made in a number of different ways. One method of preparation of silicon resins of the herein described type is by the reaction of an alkyl or aryl silicon chloride with an unsaturated secondary alcohol. For example, one mole of monomethyl silicon trichloride $(CH_3)SiCl_3$ has been found to react with less than three moles of methylvinylcarbinol (butene-1-ol-3) to form a partially hydrolyzed methyl-methylvinylcarbinoxysilicane which is readily polymerizable alone, or which can be copolymerized jointly with other monomeric materials such as vinyl compounds, to form resinous silicon polymerization products.

Generally the silicanes so formed by reaction of an unsaturated secondary alcohol such as methylvinylcarbinol or the like with an alkyl or aryl silicon halide conforms to the general formula $(R)_nSi(OR')_x(OH)_{4-n-x}$, in which R represents an alkyl or aryl group, R' represents the characteristic aliphatic group of an unsaturated secondary alcohol and where $n$ and $x$ are positive numbers less than 4 and the sum of $n$ and $x$ equals a positive number less than 4. Instead of the methylvinylcarbinol, other unsaturated secondary alcohols can be similarly used, such as 2-methylpentene-2-ol-4, pentene-1-ol-3 and 2-methylpentene-1-ol-4. Also in place of monomethyl silicon trichloride, $(CH_3SiCl_3)$, other alkyl or aryl silicon halides, such as monoethyl silicon trichloride $(C_2H_5SiCl_3)$, monomethyl silicon tribromide $(CH_3SiBr_3)$, monopropyl silicon trichloride $((C_3H_7)SiCl_3)$, diethylsilicon dichloride $((C_2H_5)_2SiCl_2)$, monophenyl silicontrichloride, $((C_6H_5)SiCl_3)$, and the like, alone or in mixtures of two or more, may be used.

In reactions of the above type involving unsaturated secondary alcohols such as methylvinylcarbinol with alkyl or aryl silicon halides the addition of water is unnecessary due to the side reactions taking place which generate water during the initial stages of the reaction. This generated water is believed to react with some of the remaining chlorine attached to the alkyl or aryl silicon halide to provide the partially hydrolyzed silicon compounds. These side reactions also result in the production of such products as methylvinylcarbinyl chloride and crotyl chloride. Typical side reactions which may take place to provide water for the production of partially hydrolyzed silicon compounds may be expressed as follows:

$$R'OH+RSiCl_3=RSi(OR')Cl_2+HCl$$
$$R'OH+HCl=R'Cl+H_2O$$

A second method of preparation of silicon resins in accordance herewith is by the reaction of alkyl or aryl silicon halides with an unsaturated hydroxy ester or an unsaturated hydroxy ether. For example, monomethyl silicon trichloride can be reacted with ethylene glycol monomethacrylate to yield as readily polymerizable compounds the partially hydrolyzed methyl-substituted ethylene glycol monomethacrylate silicanes

Generally, the silicanes so formed by reaction of unsaturated hydroxy esters or ethers with an alkyl or aryl silicon halide conform to the general formula $R_nSi(OR')_x(OH)_{4-n-x}$, in which R represents the alkyl or aryl grouping of the specific silicon halide employed, R' represents the characteristic organic grouping of the specific unsaturated hydroxy ester or ether employed, $n$ and $x$ are positive numbers less than 4 and the sum of $n$ and $x$ equals a positive number less than 4. As in the case of the unsaturated alkyl or aryl-substituted silicanes formed by the first method the partially hydrolyzed unsaturated hydroxy ester and unsaturated hydroxy ether silicanes hereby formed possess points of unsaturation which permit the copolymerization of the silicanes with other monomeric materials such as vinyl compounds and the like to form a number of resinous polymerization products of varied characteristics. In fact, the activity of the double bond in the methacrylate group in resins of this type is believed to result in a certain amount of addition polymerization taking place through the points of unsaturation when the material is polymerized without the addition of any other copolymerizing monomeric material. Other unsaturated or olefinic hydroxy esters which can be used in place of ethylene glycol monomethacrylate include the glycerol dimethacrylates and diethylene glycol monoacrylate. Other unsaturated hydroxy ethers which can be so used include ethylene glycol monovinyl ether, diethylene glycol monovinyl ether, and glycerol divinyl ether.

Silicon resins of the type herein described can also be prepared by the reaction of an alkyl or aryl silicon halide with a saturated or unsaturated primary alcohol, or, in lieu of the saturated primary alcohol, an alkylene oxide. For example, monophenyl silicon trichloride can be partially reacted with methallyl alcohol or propylene oxide followed by hydrolysis to yield partially hydrolyzed phenyl methallyl oxy silicanes or phenyl propyl oxy silicanes, respectively. By this modified method of preparing silicon compounds of the hereinabove described type using an unsaturated or saturated primary alcohol or alkylene oxide the reaction is carried out in such stoichiometric proportions and under such controlled conditions as to produce as an intermediate product an alkyl-or-aryl-substituted silicon chloride responding to the general formula $R_nSi(OR')_x(Cl)_{4-n-x}$ wherein R is the alkyl or aryl grouping of the specific alkyl or aryl silicon halide employed, R' is the characteristic organic grouping of the specific alcohol or alkylene oxide employed, $n$ and $x$ are positive numbers less than 4 and the sum of $n$ and $x$ equals a positive number less than 4. The resulting alkyl or aryl-substituted silicane chloride is then hydrolyzed to produce the corresponding hydrolyzed silicane which will respond to the same general formula $(R)_nSi(OR')_x(OH)_{4-n-x}$. When unsaturated primary alcohols are used, the compound may be polymerized alone or copolymerized in conjunction with other monomeric materials of resin-forming habit due to the presence of double bonds or unsaturation points. The presence of the hydroxy radicals, permits the resulting compounds to undergo dehydration-condensation polymerization.

In carrying out the preparation of silicanes by this latter modified procedure the stoichiometric proportions of the reacting ingredients are so chosen that the amount of the unsaturated organic reacting constituent, such as the alcohol or alkylene oxide, with respect to the amount of alkyl or aryl silicon halide, will be such that the silicon halide will be only partially reacted whereby there will remain one or more atoms of chlorine still attached to the silicon. In other words, there should be no more than two moles of the unsaturated organic constituent for each mole of a monoalkyl silicon halide used or in the case of an alkyl or aryl dihalide no more than one mole of the unsaturated organic constituent per mole of the alkyl or aryl silicon dihalide should be used. In conducting this method it is also essential that the water which is subsequently introduced be controlled and limited to the amount stoichiometrically necessary for bringing about the hydrolysis of the chlorine remaining in the silicon halide formed by reaction of the organic compound and the alkyl or aryl silicon halide. This water for hydrolysis may be added as a solution in ether.

Silicon resins of the herein described type can also be made by modified procedures wherein the resulting silicon compound of resin-forming habit responds to the modified general formula $(R)_n Si(OR')_{4-n}$ in which R represents the alkyl or aryl grouping of the specific alkyl or aryl silicon halide employed, R' represents the organic aliphatic grouping of the organic reacting compound, and $n$ equals a positive number less than 4. It is to be noted that this modified general formula is the same as the general formula heretofore set forth wherein $n$ and $x$ would be positive numbers having a total of exactly 4, thereby eliminating the hydroxyl groups from the compound. The silicon resin-forming compounds of the latter type are in all cases made from unsaturated organic materials in order to provide double bonds or points of unsaturation within the compound conducive to addition polymerization. These latter compounds may be formed as follows:

Unsaturated primary alcohol such as methallyl alcohol when reacted in excess with an alkyl or aryl silicon halide such as monomethyl silicon trichloride replaces the chlorine completely to provide a monomethyl trimethallyloxy silicane.

In order to obtain silicane of the herein described type responding to the formula

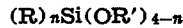

in which R represents an unsaturated secondary alcohol or an unsaturated hydroxy ester or ether the following procedure may be used. An unsaturated secondary alcohol such as methylvinylcarbinol or an unsaturated hydroxy ester such as ethylene glycol monomethacrylate is reacted with an organic silicon compound of the alkyl alkoxy type having alkyl or aryl groups attached directly to the silicon atom and also alkyl or aryl groups attached to the silicon atom through oxygen. An example of such a material is monomethyl trimethoxy silicane, $CH_3Si(OCH_3)_3$. In reacting these two materials the three methyl groups attached to the silicon through the oxygen are less stable than the methyl group attached directly to the silicon and are readily replaced by the characteristic grouping of the unsaturated secondary alcohol or unsaturated hydroxy ester and as a result the corresponding alkyl-substituted unsaturated silicane is formed.

In order that the invention may be more clearly understood, and for illustrative purposes the following examples are set forth giving the detailed practice to be employed in carrying out the invention. Unless otherwise stated all parts are to be considered as parts by weight.

Example I 135 parts of a freshly prepared mixture consisting of ½ monomethyl silicon trichloride ($CH_3SiCl_3$) and ½ dimethyl silicon dichloride (($CH_3)_2SiCl_2$) are placed in a glass-lined reaction vessel provided with a dropping funnel, a reflux condenser and a stirrer. One end of the drying tube is attached to the top of the condenser, the other to a suitable connection for leading the evolved hydrochloric acid gas to water where it is absorbed. Provision is made to prevent the water from sucking back into the reaction vessel. 115 parts of methylvinylcarbinol are placed in the dropping funnel and allowed to feed slowly into the mixture of methyl silicon chlorides. Hydrochloric acid gas is evolved which cools the reaction mixture during the first stages of the reaction period; cooling may be applied to the reaction chamber near the end of the reaction period. The mixture is agitated periodically during the addition of the alcohol. The product so obtained is stripped of volatiles under a pressure of 17 mm. with a gradual temperature rise to 100 degrees C. The reaction product remaining is a clear amber colored, slightly viscous liquid, resinous syrup. The volatiles collected as a distillate can be identified as a mixture of methyl vinyl carbinyl chloride and crotyl chloride plus any excess methylvinylcarbinol. The crotyl chloride probably results from an allylic rearrangement of the methyl vinyl carbinyl chloride.

The resulting silicon resin syrup has the following properties. It is of satisfactory stability and can be stored at room temperatures for a period of weeks without gelling or showing other signs of deterioration. On continued heating in a vacuum its viscosity increases until it becomes a sticky solid. When films of the silicon resin syrup are heated gradually in an oven to 300° F. during several hours they set to a strong, infusible solid. Fiber glass cloth, coated with several layers of the resinous syrup and baked between coatings and given a final one hour's baking at 300° F., is given a clear, non-tacky and glassy coating which is quite flexible. The filled glass cloth is highly waterproof.

Example II 108 parts of a freshly prepared mixture consisting of ½ monomethyl silicon trichloride and ½ dimethyl silicon dichloride diluted with 280 parts of dry ether are placed in a glass-lined reaction vessel provided with a dropping funnel, a reflux condenser and a stirrer. One end of a drying tube is attached to the top of the condenser, the other to a suitable connection for leading the evolved hydrochloric acid gas to water where it is absorbed. Provision is made to prevent the water from sucking back into the reaction chamber. 260 parts of ethylene glycol monomethacrylate stabilized with a trace of hydroquinone in 560 parts of dry ether are placed in the dropping funnel and allowed to drop slowly into the mixture of methyl silicon chlorides. Hydrochloric acid gas is evolved which cools the reaction mixture during the first stages of the reaction; cooling may be applied to the reaction chamber near the end of the reaction. The reaction mixture is agitated periodically during the addition of the ethylene glycol monomethacrylate. The reaction product is vacuum distilled to remove the ether; upon further distillation a distillate consisting principally of beta-chloroethyl methacrylate and water is obtained. 98.5 parts of a silicon syrup remains in the reaction vessel.

20 parts of freshly prepared silicon compound made in accordance with Example II and containing a trace of hydroquinone, when mixed with 0.1 part of benzoyl peroxide, and air excluded, and then heated for 16 hours at 62° C., 5 hours at 73° C. and 4 hours at 120° C., polymerized to a transparent, flexible and resilient amber colored solid.

A mixture of 20 parts of the same silicon compound containing a trace of hydroquinone and 20 parts of styrene together with 0.2 part of benzoyl peroxide when subjected to the same heat treatment, copolymerized to a transparent, flexible and resilient amber-colored solid.

A mixture of 20 parts of the same silicon compound containing a trace of hydroquinone and 50 parts of styrene, together with 0.3 part benzoyl peroxide, when cured with the exclusion of air for 16 hours at 80° C. followed by 44 hours at 110° C., copolymerized to form a hard, non-flexible, transparent, light amber-colored resin body.

The various silicon resins hereby obtained are capable of many uses as adhesives for organic and inorganic materials, as well as for coating and impregnating purposes. Their highly hydrophobic character renders them particularly valuable for the treatment of materials which it may be desired to render waterproof or resistant to water. Their silicon content and availability in various viscosities give them a wide field of use, and make them valuable where a resistance to relatively high temperature is desirable. They may be used for impregnating cement, stone, bricks and the like, and when ground with suitable pigments such as zinc oxide, red iron oxide and magnesium oxide, provide paints of good brushing ability. Such paints when baked at 300° F. for several hours produce hard adherent coatings.

The silicon resins of the present invention can also be used as bonds in the making of bonded abrasive products such as grinding wheels and stones, or can be applied to suitable paper, cloth or other flexible backing materials as an impregnant for the backing or as an adhesive for the attachment of the abrasive grains to the backing in the manufacture of abrasive coated products.

The silicon resins of the present invention are also useful to make electrical insulation. For example, electrical insulating tape can be made of glass fibers impregnated with a silicon resin syrup made according to the present invention and baked in an oven to harden. The pores in the glass cloth are filled with a solid resin high in silica content.

Although the various silicon resins as herein made are readily polymerizable alone and possess the maximum of heat resistance when so used they can be modified in many ways by copolymerization with numerous other resin-forming monomeric materials. Among such resin-forming substances with which the above silicon resins can be copolymerized are included vinyl compounds such as vinyl acetate, vinyl chloride, vinylidene chloride, styrene, acrylic and methacrylic acids and esters such as methyl methacrylate, methacrylic acid, acrylic and methacrylic nitriles, halogen substitution products of acrylic and methacrylic acid and other similar substances.

The nomenclature for organic silicon compounds still being in the formative stage it is desired to point out that in the present specification and claims an attempt has been made to follow as consistently as possible a system of using the silicane root in defining compounds, wherein silicane is the simplest silicon hydride ($SiH_4$). Thus $(CH_3)_3SiH$ becomes trimethyl silicane; $(CH_3)_2SiCl_2$ becomes dimethyl dichloro silicane; $(CH_3)_2Si(OH)_2$ becomes dimethyl silicane diol; $(CH_3)_3Si(OH)$ becomes trimethyl silicanol (or for the purpose of brevity in the case of mono alcohols, the term silicanol is shortened to silicol and $(CH_3)_3SiOH$ would be called trimethyl silicol); and

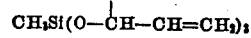

becomes monomethyl, tri-methylvinylcarbinoxy silicane. In the specification and claims, where reference is made to an alkyl or aryl substituted silicane, a compound of the latter type responding to the general formula $(R)_nSi(OR')_{4-n}$ is intended, wherein R is an alkyl or aryl grouping, and R' is one of the organic groupings set forth in detail earlier in the specification. A partially hydrolyzed alkyl substituted silicane is considered to be a silicane of the same type in which the R and OR' groups total less than 4 and hydroxyl radicals make up the difference.

Having described the invention, it is desired to claim:

1. The process of making silicon resins which comprises reacting an organic substituted silicon tetrahalide containing direct carbon to silicon linkage in which the organic grouping is selected from the group consisting of alkyl and aryl radicals, there being two halogen atoms and two such organic groupings to three halogen atoms and one such organic grouping per silicon atom of the tetrahalide, with an unsaturated secondary monohydroxy alcohol having terminal $CH_2=$ unsaturation to produce a silicol containing $CH_2=$ unsaturation, such reaction generating water in side reactions, and polymerizing the reaction product thereof.

2. The process of making silicon resins which comprises reacting an organic substituted silicon tetrahalide containing direct carbon to silicon linkage in which the organic grouping is selected from the group consisting of alkyl and aryl radicals, there being two halogen atoms and two such organic groupings to three halogen atoms and one such organic grouping per silicon atom of the tetrahalide, with an unsaturated monohydroxy ester of a glycol and an acrylic acid of from 3 to 4 carbon atoms to produce a silicol containing $CH_2=$ unsaturation, such reaction generating water in side reactions, and polymerizing the reaction product thereof.

3. The process of making silicon resins which comprises reacting an alkyl silicon halide containing direct carbon to silicon linkage, there being two halogen atoms and two alkyl groups to three halogen atoms and one alkyl group per silicon atom of the halide, with an unsaturated monohydroxy secondary alcohol having terminal $CH_2=$ unsaturation to produce a silicol containing $CH_2=$ unsaturation, such reaction generating water in side reactions, and polymerizing the reaction product thereof.

4. An organic resinous silicon polymer obtained by polymerizing at least one silicol having the monomeric formula $(R)_nSi(OR')_x(OH)_{4-n-x}$, wherein R is an organic hydrocarbon radical selected from the group consisting of alkyl and aryl radicals, R' is a residual aliphatic grouping of an unsaturated aliphatic monohydroxy alcohol having terminal $CH_2=$ unsaturation after removal of an hydroxyl group therefrom, n and x are integers within the limits of 1 and 2, and $n+x$ is an integer less than 4 and more than 1.

5. An organic resinous silicon polymer obtained by polymerizing at least one silicol having the monomeric formula $(R)_nSi(OR')_x(OH)_{4-n-x}$, wherein R is an alkyl radical, R' is a residual aliphatic grouping of an unsaturated aliphatic monohydroxy alcohol having terminal $CH_2=$ unsaturation after removal of an hydroxyl group therefrom, n and x are integers within the limits of 1 and 2, and $n+x$ is an integer less than 4 and more than 1.

6. An organic resinous silicon polymer obtained by polymerizing at least one silicol having the monomeric formula $(R)_nSi(OR')_x(OH)_{4-n-x}$, wherein R is an aryl radical, R' is a residual aliphatic grouping of an unsaturated aliphatic monohydroxy alcohol having terminal $CH_2=$ unsaturation after removal of an hydroxyl group therefrom, $n$ and $x$ are integers within the limits of 1 and 2, and $n+x$ is an integer less than 4 and more than 1.

7. An organic resinous silicon copolymer obtained by polymerizing at least one silicol having the monomeric formula $(R)_nSi(OR')_x(OH)_{4-n-x}$, wherein R is an organic hydrocarbon radical selected from the group consisting of alkyl and aryl radicals, R' is a residual aliphatic grouping of an unsaturated aliphatic monohydroxy alcohol having terminal $CH_2=$ unsaturation after removal of an hydroxyl group therefrom, $n$ and $x$ are integers within the limits of 1 and 2, and $n+x$ is an integer less than 4 and more than 1, and an unsaturated monomeric material containing a terminal vinylidene ($CH_2=C=$) group and selected from the group consisting of vinyl acetate, vinyl chloride, vinylidene chloride, styrene, and acrylic and methacrylic acids, esters and nitriles.

8. The method of making organic silicon resins which comprises reacting in an initially non-aqueous medium beta methacryloxyethanol with alkyl silicon halide containing two halogen atoms and 2 alkyl radicals to three halogen atoms and one alkyl radical attached to each silicon atom to produce a syrup containing beta methacryloxyethoxy alkyl siliconols and their partial dehydration products, such reaction generating water in side reactions, and thereafter polymerizing the resulting syrup by means of heat.

9. An organic silicon resin obtained by the method of claim 8.

10. An organic silicon resin obtained by polymerizing at least one silicol having the monomeric formula $R_nSi(OR')_x(OH)_{4-n-x}$ where R is an alkyl radical and R' is the residual grouping of methyl vinyl carbinol after removal of a hydroxyl group therefrom, $n$ and $x$ are integers within the limits of 1 and 2, and $n+x$ is less than 4 and more than 1.

11. An organic silicon resin obtained by polymerizing at least one silicol having the monomeric formula $R_nSi(OR')_x(OH)_{4-n-x}$ where R is an aryl radical and R' is the residual grouping of methyl vinyl carbinol after removal of a hydroxyl group therefrom, $n$ and $x$ are integers within the limits of 1 and 2, and $n+x$ is less than 4 and more than 1.

NORMAN P. ROBIE.

REFERENCES CITED

The following references are of record in the file of this patent:

UNITED STATES PATENTS

| Number | Name | Date |
|---|---|---|
| 2,058,394 | Arvin | Oct. 27, 1936 |
| 2,160,942 | Britton | June 6, 1939 |
| 2,253,128 | Langkammerer | Aug. 19, 1941 |
| 2,276,094 | Rothrock | Mar. 10, 1942 |
| 2,396,692 | Garner | Mar. 19, 1946 |

FOREIGN PATENTS

| Number | Country | Date |
|---|---|---|
| 641,075 | Germany | Jan. 21, 1937 |

OTHER REFERENCES

Robison et al.: J. Chem. Soc. (London), vol. 93, 1908, pages 442 to 444.

Andrianov J. of General Chem. U. S. S. R., vol. 18, 1938, pp. 1255 to 1262. Translation available in vol. 4, of "Organo-Silicon Literature" Dow Corning article 4, 11 pages.